(12) United States Patent
Houchin et al.

(10) Patent No.: US 12,180,715 B2
(45) Date of Patent: Dec. 31, 2024

(54) COMMERCIAL ROOFING SPECIFICALLY IN THE AREA OF ROOFING INSULATION AND COVERBOARDS

(71) Applicant: JOHNS MANVILLE, Denver, CO (US)

(72) Inventors: Jonas Houchin, Centennial, CO (US); Richard Barnes, Littleton, CO (US)

(73) Assignee: Johns Manville, Denver, CO (US)

( * ) Notice: Subject to any disclaimer, the term of this patent is extended or adjusted under 35 U.S.C. 154(b) by 130 days.

(21) Appl. No.: 17/851,894

(22) Filed: Jun. 28, 2022

(65) Prior Publication Data
US 2023/0417058 A1    Dec. 28, 2023

(51) Int. Cl.
*B32B 37/18*    (2006.01)
*E04D 3/35*     (2006.01)
*E04D 13/16*    (2006.01)

(52) U.S. Cl.
CPC .............. *E04D 3/352* (2013.01); *B32B 37/18* (2013.01); *E04D 13/1606* (2013.01)

(58) Field of Classification Search
CPC ......... E04D 13/006; E04D 11/02; E04B 7/22; E04B 1/665
See application file for complete search history.

(56) References Cited

U.S. PATENT DOCUMENTS

2014/0361796 A1* 12/2014 Vokey .................. E04D 13/006
                                                            324/693
2023/0175265 A1*  6/2023 Christian ................. E04D 5/10
                                                            52/411

FOREIGN PATENT DOCUMENTS

RU           2743083 C2 *  2/2021  ............. B32B 15/00
WO    WO-2019244164 A1 * 12/2019  ............. B32B 37/18

* cited by examiner

*Primary Examiner* — Vishal I Patel
(74) *Attorney, Agent, or Firm* — Robert D. Touslee

(57) ABSTRACT

A method of manufacturing a conductive roofing board may include pouring a polyisocyanurate foam on top of a facer. The method may include laminating the polyisocyanurate foam and the facer to cure the polyisocyanurate foam and adhere the polyisocyanurate foam to the facer to form a roofing board. The method may include applying a conductive coating to an exposed surface of the facer, wherein the conductive coating has a coating weight of between about 0.1 lb/100 sqft and 10 lb/100 sqft. The method may include exposing the roofing board and the conductive coating to a heating device to cure the conductive coating.

13 Claims, 6 Drawing Sheets

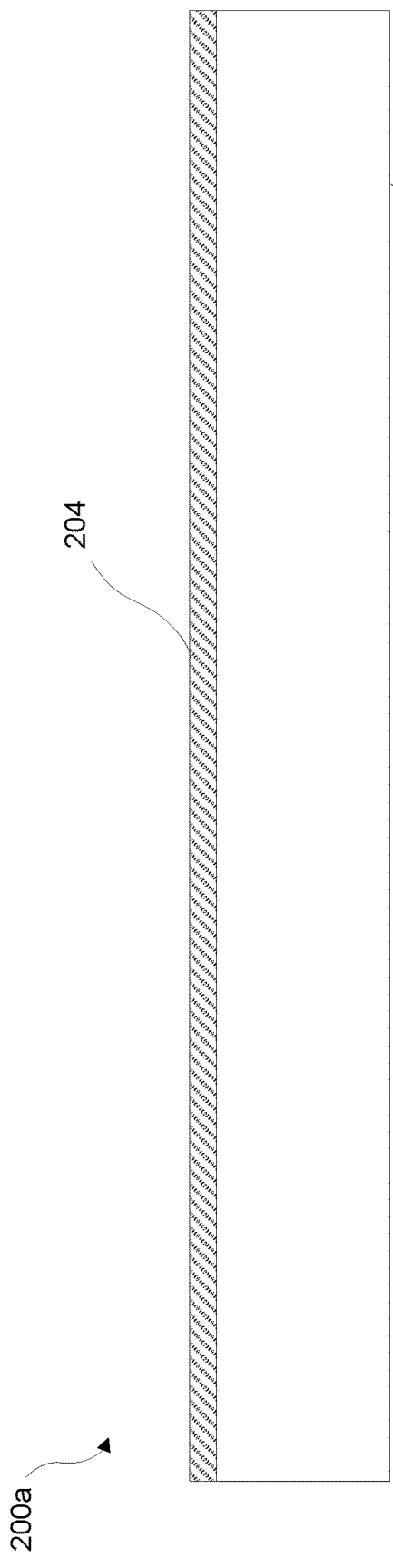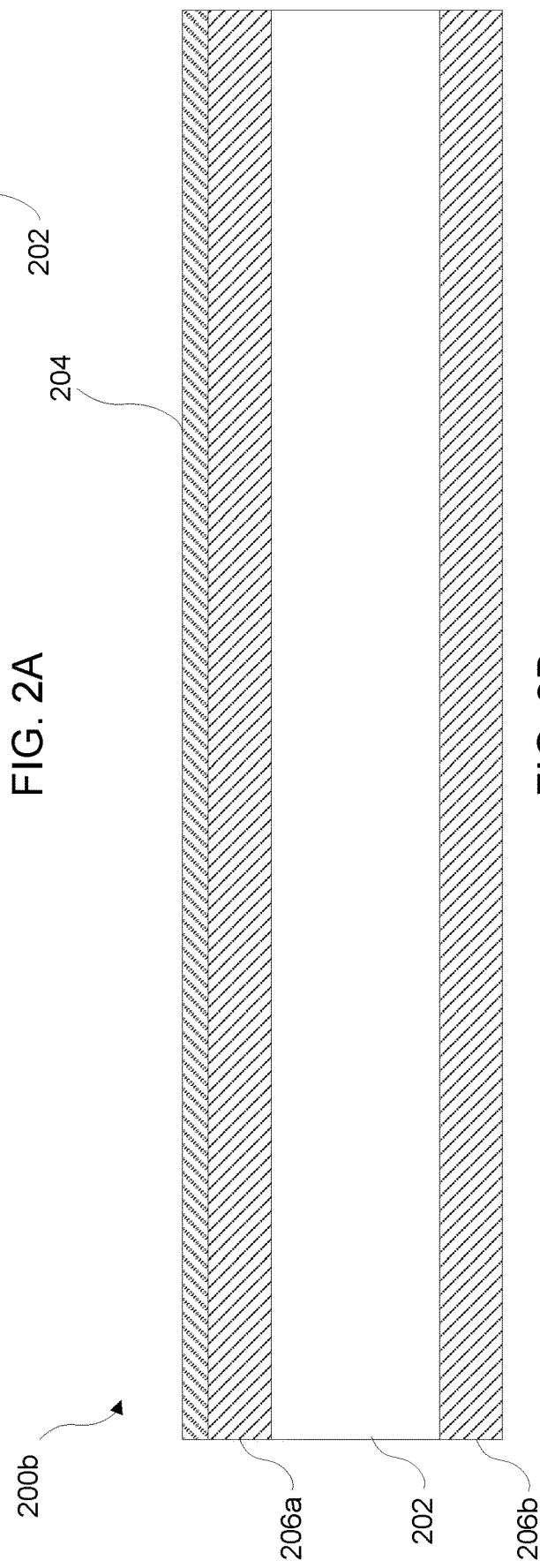

COMMERCIAL ROOFING SPECIFICALLY IN THE AREA OF ROOFING INSULATION AND COVERBOARDS

BACKGROUND

Electronic leak detection systems are currently used to detect the presence of leaks within roofing membranes, such as single play roofing membranes. To facilitate these leak detection systems the roofing structure needs to include a conductive material to create a current loop which may indicate the presence of a leak. Conventionally, this conductive material is applied in the form of a water and/or solvent-based primer that includes conductive components. These primers are applied in the field, which may increase the time needed to install the roof. For example, the primer materials need time to dry prior to applying a roofing membrane. Additionally, if not fully dried, the water and/or solvents in the primer may impact integrity of facers or boards of the roofing structure. Moreover, these primers are applied by hand, which makes it difficult to apply the primer at a consistent coating weight/thickness, which may affect performance of the electronic leak detection system and/or lead to excess primer being applied. Therefore, improvements in electronic leak detection systems are desired.

SUMMARY

Some embodiments of the present technology may encompass methods of manufacturing a conductive roofing board. The methods may include pouring a polyisocyanurate foam on top of a facer. The methods may include laminating the polyisocyanurate foam and the facer to cure the polyisocyanurate foam and adhere the polyisocyanurate foam to the facer to form a roofing board. The methods may include applying a conductive coating to an exposed surface of the facer. The conductive coating may have a coating weight of between about 0.1 lb/100 sqft and 10 lb/100 sqft. The methods may include exposing the roofing board and the conductive coating to a heating device to cure the conductive coating.

In some embodiments, the conductive coating may include one or more selected from the group consisting of carbon black, graphite, carbon fibers, graphene, steel fibers, and carbon nanotubes. The facer may include one or both of a nonwoven glass mat facer or a paper facer. The conductive coating may be applied with a coating uniformity of at least about 90% across a surface area of the facer. Applying the conductive coating may include one or both of roll coating and spray coating the conductive coating onto the facer. Applying the conductive coating may include coating a downward-facing surface of the facer. The conductive coating may have a resistance level of between about $1\times10^2$ and $1\times10^7$ ohms per square. The conductive coating may saturate an interior region of the facer.

Some embodiments of the present technology may encompass methods of manufacturing a conductive roofing board. The methods may include providing a roofing board. The roofing board may include a first major surface and a second major surface opposite the first major surface. The methods may include applying a conductive coating to an outer surface of the roofing board. The conductive coating may have a coating weight of between about 0.1 lb/100 sqft and 10 lb/100 sqft.

In some embodiments, the roofing board may include a polyisocyanurate foam board, an oriented strand board, a wood fiber board, a plywood board, or a gypsum board. The conductive coating may be applied directly to the first major surface of the roofing board. The outer surface of the roofing board may include a facer applied to the first major surface of the roofing board. The conductive coating may be applied to an exposed surface of the facer. Applying the conductive coating may include applying the conductive coating to the outer surface of the roofing board. The method may further include exposing the roofing board and the conductive coating to a heating device to cure the conductive coating. A coating uniformity of the conductive coating may be at least 90%. Applying the conductive coating may include pouring polyisocyanurate foam onto a facer that comprises the conductive coating.

Some embodiments of the present technology may be directed to conductive roofing boards. The roofing boards may include a roofing board substrate having a first major surface and a second major surface opposite the first major surface. The roofing boards may include a conductive coating that covers the first major surface of the roofing board. The conductive coating may include a coating weight of between about 0.1 lb/100 sqft and 10 lb/100 sqft and may have a coating uniformity of at least about 90%.

In some embodiments, the roofing boards may include a facer that is interposed between the first major surface and the conductive coating. The facer may include one or both of a nonwoven glass mat facer or a paper facer. The roofing board may be a first roofing board. A second roofing board may be stacked against the first roofing board, with a major surface of the second roofing board being substantially parallel with the first major surface. The conductive coating may be a first conductive coating. The second roofing board may include a second conductive coating. The first conductive coating and the second conductive coating may face in opposite directions.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 2A illustrates a roofing cover board according to one embodiment of the present invention.

FIG. 2B illustrates a roofing cover board according to one embodiment of the present invention.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the present invention are directed to methods of manufacturing conductive roofing boards that may be usable in electronic leak detection systems without the need to apply a conductive primer or other conductive material in the field during installation of the roof. Embodiments may include faced and/or unfaced roofing boards that include an outer conductive coating (such as a conductive primer) that enable installation of a roofing membrane to be commenced immediately after installing the roofing boards. As the roofing boards already include a conductive coating, no dry time is needed, which may significantly reduce the installation time for the roofing system. Additionally, as the conductive material is applied during manufacture of the roofing boards, rather than during installation, there is no risk of the conductive coating affecting the integrity of the roofing membranes. Moreover, the application of the conductive material at the factory may enable the conductive coating to be more evenly applied across the surface of the roofing board, which may improve performance and reduce the risk of applying excess conductive material.

Figure 1:
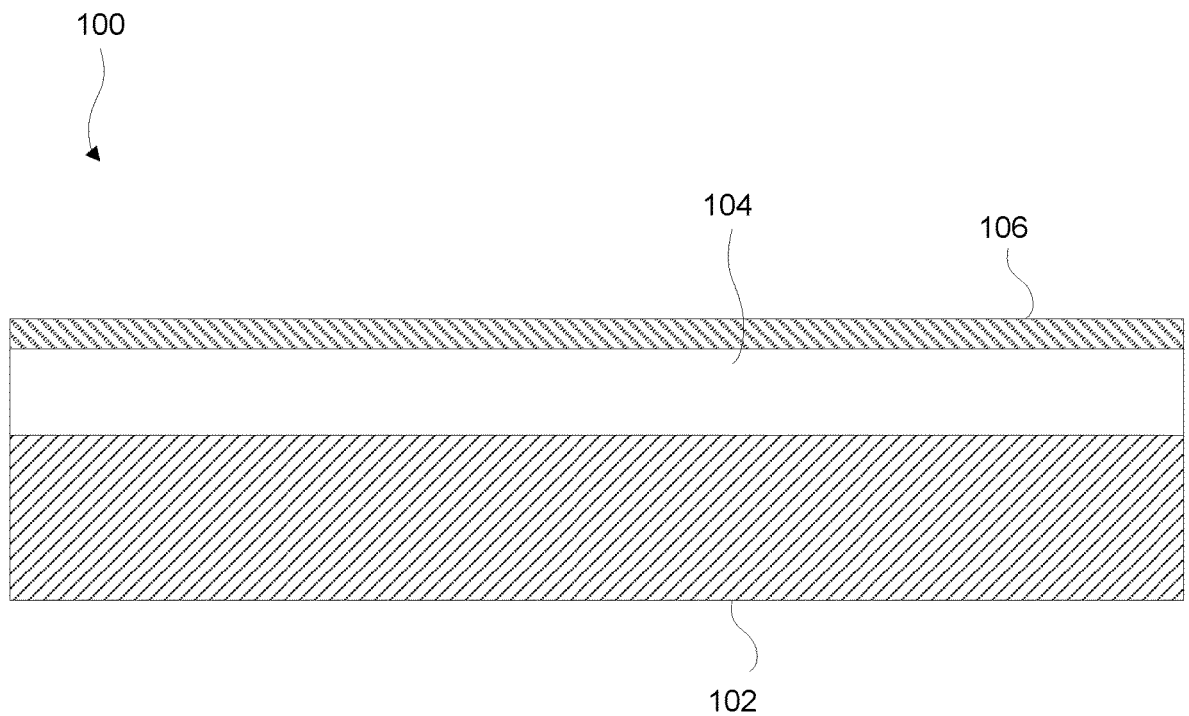
FIG. 1 illustrates a roofing structure according to one embodiment of the present invention.

Turning now to FIG. 1, one embodiment of a roof structure 100 is illustrated. Roof structure 100 may include a roof deck 102, which may be formed from various materials such as, but not limited to, steel, concrete, cement and/or wood. Roof deck 102 may serve as a primary substrate on which various insulation and/or weatherproofing layers are supported. Roof structure 100 may include a number of roofing cover boards 104, which may protect the roof deck 102 and/or provide insulation to the roof structure 100. The roofing cover boards 104 may include polyisocyanurate, oriented strand board, gypsum, and/or other roofing boards. Additional structural and/or insulation layers may be included in some embodiments. A roofing membrane 106 may be positioned atop roof structure, oftentimes above the cover boards 104 and/or other insulation layer, and may be configured to prevent leaks in the roofing structure 100 and/or to provide aesthetic appeal. Typically, the roofing membrane 106 may be in the form of a single ply membrane. The term "single-ply" may be used to describe a roof structure having a single application of a roofing membrane 106, but the roofing membrane 106 itself may include multiple layers. For example, the roofing membrane 106 may include polymer layers, reinforcing layers, adhesive layers, coatings, a fleece layer, and the like. It will be appreciated that in some embodiments, multiple layers of roofing membrane 106 may be applied to a single roof structure.

Oftentimes, the roofing membrane 106 may be provided as a roll of flat, flexible membrane that may be rolled out on top of the roof structure. For example, a single ply roofing membrane 106 may be supplied in any workable size (such as, but not limited to, rolls of 10 feet wide or more and containing 100 linear feet or more of roofing membrane 106). Oftentimes, the roof structure may be too large to be covered by a single piece of roofing membrane 106. In such instances, multiple pieces of roofing membrane 106 may be overlapped and joined at the seams using a waterproof joining method. For example, seams of adjacent pieces of roofing membrane 106 may be joined by priming and/or preparing edges of the roofing membranes 106 and then applying a tape to the primed and/or prepared edges, using heat welding and/or using another form of adhesive bonding. In priming or preparing the edges, the installer must wait for the primer material to flash before applying the adhesive. Improper application of the primer and/or adhesive may result in an improper bond, which may create immediate and/or long term roofing problems, such as leakage. Examples of using and installing single ply roofing membranes 106 may be found in U.S. Patent Publication No. 2016/0362894, entitled "Sheet Roofing with Pre-Taped Seams and Tape Therefor" and filed Aug. 25, 2016, the entire contents of which is hereby incorporated by reference for all purposes.

In some embodiments, roofing membrane 106 may include one or more polymeric membranes and/or other waterproofing layer. For example, a polymeric membrane may form the outer layer of the roof once fully installed, and may help prevent leaks in the roofing structure and provides aesthetic appeal to the finished roof. For example, the waterproofing layer often provides a uniform outer surface that provides an aesthetically pleasing finished appearance to the roof. Polymeric membrane may have a white exterior, but may be made in various other colors or shades, such as grey, tan, black, and the like. White polymeric membranes are often used to provide a pleasing appeal to the building and/or to reflect radiation and thereby minimize heat island effects. In other embodiments, a black or other dark polymeric membrane may be provided. Such polymeric membranes absorb more radiant heat than white polymeric membranes. Additionally, in the winter, condensation evaporates quicker and snow and ice melt more rapidly on black roofs than white roofs.

In some embodiments, polymeric membranes may be formed of various synthetic rubber materials, modified bitumen, or thermoplastic materials. For example, roofing membrane 106 may commonly include thermoplastic polyolefin (TPO), polyvinyl chloride (PVC), ethylene propylene diene monomer (EPDM), chlorinated polyethylene (CPA), and/or modified bitumen, although some embodiments may use other thermoset and/or thermoplastic roofing membranes. In some embodiments, the polymeric membrane may include one or more polymers blended with one or more fillers. For example, in some embodiments the polymeric membranes may include some combination of the following materials: polypropylene, polyethylene, block copolymer polypropylene, rubber, plasticizers, fiberglass, carbon fiber, fire retardants, and the like. In another embodiment, a polymeric membranes may have a more pure polymer blend without or with very few fillers. For example, the polymeric membrane may include mainly polypropylene or polyethylene or some combination of these polymers with little to no fillers, although in some embodiments, these polymeric membranes may include some amount of a filler, such as a fire retardant. In some embodiments, the polymeric membrane may have a thickness of between about 500 μm to about 3 mm, however other thicknesses are possible in various embodiments.

To enable the roofing system to utilize electronic leak detection to identify leaks within the roofing membrane, the roofing cover boards may include a conductive coating on at least a top surface of the roofing cover board. FIGS. 2A and 2B depict a roofing cover board 200 having a conductive coating according to embodiments of the present invention. Roofing cover boards 200 may be used as roofing cover boards 104 in some embodiments. Roofing cover board 200 may include a roofing board substrate 202. Roofing board substrate 202 may be formed of or otherwise include polyisocyanurate foam, gypsum, oriented strand board, plywood, wood fiber, perlite, and/or other roofing board material. An upper surface (when installed) of the roofing board substrate 202 may include a conductive coating 204, such as a conductive primer or other material. The conductive coating 204 may include one or more conductive materials such as, but not limited to, carbon black, graphite, carbon fibers, graphene, steel fibers, carbon nanotubes, and/or other conductive materials. In some embodiments, the conductive materials may make up between about 5% and 30% by weight of the conductive coating 204, more often between about 8% and 15% by weight of the conductive coating 204. A remaining portion of the conductive coating 204 may include water (and/or another solvent) and/or one or more fillers. Do you have any more information on what we may want to include in the composition of the coating? The conductive coating 204 may be applied to the roofing board substrate 202 with a coating weight of between about 0.1 lb/100 sqft and 10 lb/100 sqft and/or at a thickness of between about 1 mil and 15 mils. As the conductive coating 204 is applied via machine in the factory, the conductive coating 204 may be more consistently applied than in conventional applications in which the primer is applied manually during installation. As a result, the conductive coating 204 may be substantially uniform across the entire surface area of the roofing board substrate 200. For example, the conductive coating may have a coating uniformity (e.g., coating thickness and/or coating weight) that is uniform to within 90%, to within 95%, to within 96%, to within 97%, to within 98%, to within 99%, or more across a surface of the roofing board substrate 202. The conductive coating 204 may have an electrical resistance level of between about $1\times10^2$ and $1\times10^7$ ohms per square, between about $1\times10^3$ and $1\times10^6$ ohms per square, or between about $1\times10^4$ and $1\times10^5$ ohms per square. The coated roofing cover boards 200 may be designed to pass ASTM tests D7877-14 and/or D8231-19 for use in electronic leak detection testing.

As illustrated in FIG. 2A, the conductive coating 204 may be applied directly to an upper surface of the roofing board substrate 202 of roofing cover board 200a, with the conductive coating 204 being coextensive with the upper surface of the roofing board substrate 202. This may be particularly common when the roofing board substrate 202 includes oriented strand board, plywood, and/or wood fiber boards. In other embodiments, one or more intervening layers may be provided. FIG. 2B illustrates an embodiment of a roofing cover board 200b that includes one or more facers 206 applied to the upper surface (facer 206a) and/or lower surface (facer 206b) of the roofing board substrate 202. The facers 206 may be any type of facer known in the art. For example nonwoven glass mat facers, paper facers (including kraft paper facers) and/or combinations thereof may be used as facers 206. One or more of the facers 206 may be coated (such as with a mineral/clay-based coating) and/or may be uncoated in various embodiments. For example, the conductive coating 204 may be applied to an exposed major surface (e.g., top surface when installed) of the facer 206a on the upper surface of the roofing board substrate 202 such that the conductive coating 204 and facer 206a cover the upper surface of the roofing board substrate 202. In some embodiments, the conductive coating 204 may impregnate and/or otherwise saturate the facer 206a. In a particular embodiment, the facer 206a may be a nonwoven glass mat facer, and the conductive coating 204 may saturate the facer 206a such that at least some of the conductive coating fills voids formed between the individual glass fibers. Where two facers 206 are used, the facers 206 may be the same and/or may be different.

Figure 3:
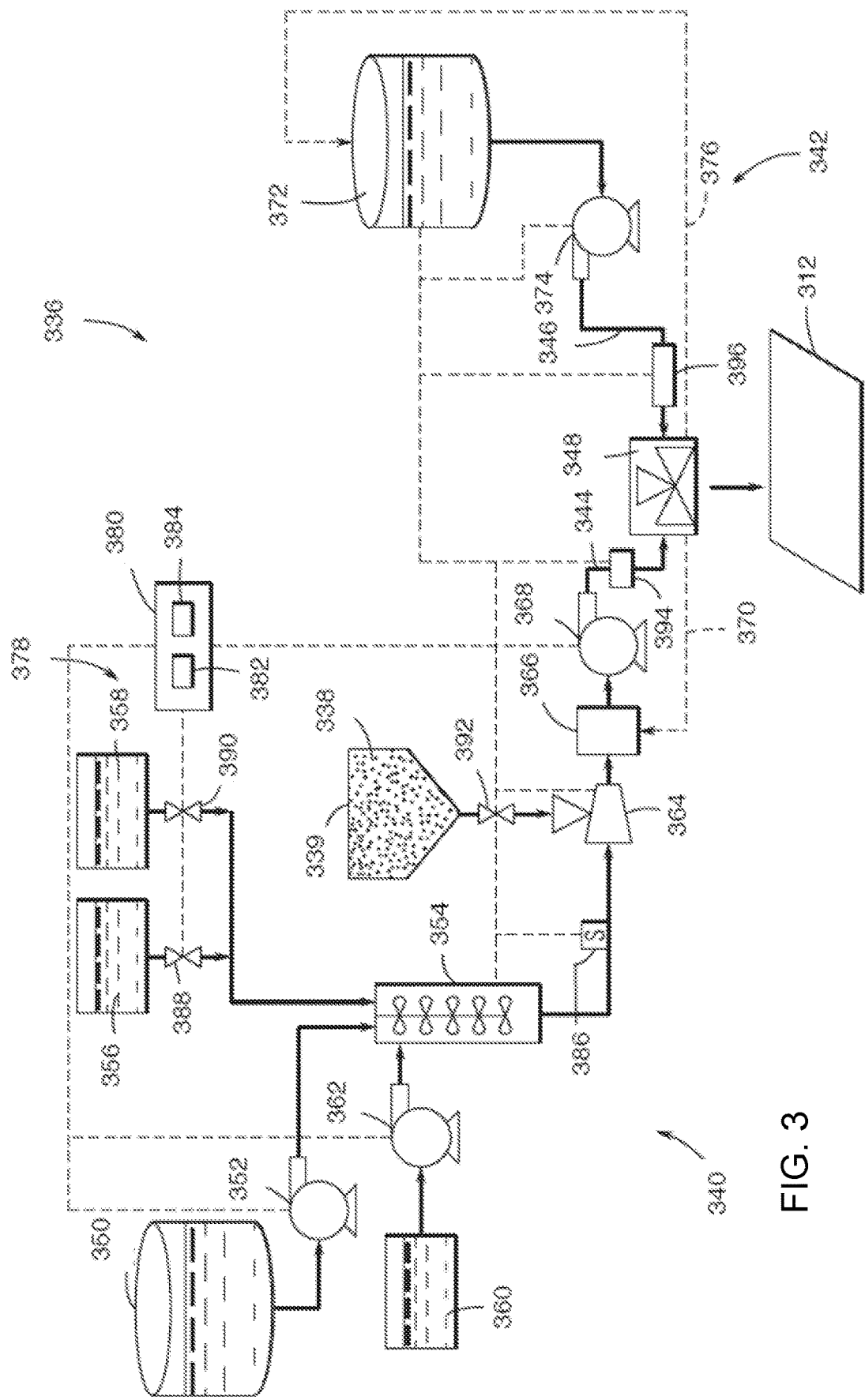
FIG. 3 illustrates a manufacturing system for forming a polyisocyanurate foam conductive roofing board according to one embodiment of the present invention.

FIG. 3 is a schematic view of an embodiment of a manufacturing system for making a polyisocyanurate foam roofing board with a conductive coating, similar to roofing board 200. Manufacturing system 300 may be used to produce a polyisocyanurate foam 312, such as that used to make roofing board substrate 202. As will be explained below, the manufacturing system 336 may include a first chemical line 340 and a second chemical line 342. The first chemical line 340 forms a first mixture 344 and the second chemical line 342 forms and/or carries a second chemical mixture 346 to a mixing head 348. At the mixing head 348, the manufacturing system 336 combines the first and second chemical mixtures 344, 346, enabling the first and second mixtures 344, 346 to chemically react and form the foam layer 312. For example, the first chemical line 340 includes an isocyanate-reactive compound such as a polyol. In accordance with the present invention, a threshold amount of water is included within the first chemical line 340. The order in which ingredients are added to the first chemical line 340 can be varied. The timing of the addition of the water can also be varied. For example, in some embodiments, water is combined with the polyol, optionally with one or more other ingredients such as surfactants, catalysts, and/or additives.

In some embodiments, water is introduced to the first chemical line 340 by using an in-line continuous mixer at a pressure of less than 3,400 kPa. In other embodiments, the water and the polyol are mixed at pressure of a less than 3,400 kPa to dissolve or emulsify the polyol and water within the B-side stream. In some embodiments, the water is introduced to the first chemical line 340 (i.e., combined with the polyol) prior to introducing the blowing agent.

The first chemical line 340 forms the first mixture 344, by pumping polyol 350 from a storage tank or polyol source 351 with a pump 352 into a mixer 354 (e.g., dynamic mixer). In the mixer the polyol 350 may be combined with one or more catalysts 356 (e.g., potassium octoate, potassium acetate, amine, surfactants, etc.) from a catalyst source 357. In some embodiments, additives and/or fillers may be added. For example, the polyol may be combined with a reactive viscosity additive 358 (e.g., propylene glycol, diethylene glycol, polypropylene glycol, propylene carbonate) from a viscosity additive source 359 that reduces the viscosity of the first mixture 344. In some embodiments, a filler 338 may be added to the first mixture 344 to increase the viscosity. By including the viscosity additive 358 the manufacturing system 336 is able to maintain a desired viscosity of the first mixture 344 with the added filler 338. The use of fillers (and resultant use of viscosity reduction additives) may be useful to further reduce the costs of producing the polyisocyanurate foam roofing cover boards, while maintaining sufficient material to produce a high density roofing board substrate 202. The fillers may include inorganic, organic powders, platelets, fibers, granules, or a combination thereof with particle sizes less than one hundred and fifty microns. In some embodiments, the particle size may be less than ten microns, which may facilitate mixing of the filler in the foam layer(s) 312 as well as homogeneity. Examples of fillers may include talc, kaolin, glass dust, mica, carbon black, magnesium hydroxide, gypsum, calcium carbonate, expanded perlite, glass fibers, or a combination thereof. In some embodiments, the viscosity additive 358 (e.g., propylene glycol, diethylene glycol, polypropylene glycol, etc.) may be selected to increase adhesion between the roofing board substrate 202 and any additional layers (e.g., facer(s) 206). In other words, the viscosity additive 358 may compensate for a possible reduction in adhesion between the roofing board substrate 202 and additional layers (e.g., facer(s) 206) when filler 338 is added to the roofing board substrate 202.

As the polyol 350, catalysts 356, and any optional viscosity additive 358 and/or filler 338 mix in the mixer 354, a blowing agent 360 (such as an alkane blowing agent like a pentane) from a blowing agent source 361 may be pumped into the mixer 354 with a pump 362. For example, the blowing agent 360 may be water mixed with pentane. During the chemical reaction between the first mixture 344 and the second mixture 346 the blowing agent 360 evaporates forming bubbles in the foam layer 312, which increases the insulative properties of the foam layer 312.

In some embodiments, the amount of alkane blowing agent (e.g., pentanes) used in the manufacture of polyisocyanurate foam is between about 12 and 40 parts by weight alkane blowing agent per 100 parts by weight of polyol, more commonly between about 18 and 33 parts by weight alkane blowing agent per 100 parts by weight of polyol.

Optionally, after exiting the mixer 354, the polyol 350, catalysts 356, any additives and/or blowing agent 360 enter a mixer 364 (e.g., solid-liquid mixer, eductor mixer) where filler 338 is added. As the filler 338 combines with the polyol 350, catalysts 356, viscosity additive 358, and blowing agent 360, the filler 338 increases the viscosity of the first mixture 344, which compensates for the previously added viscosity additive 358. In some embodiments, the filler 338 may be talc, kaolin, glass dust, mica, carbon black, magnesium hydroxide, gypsum, calcium carbonate, expanded perlite, glass fibers, or a combination thereof.

The first mixture 344 may then enter a tank 366 (e.g., a surge tank) that compensates for variations in the production process. For example, the manufacturing system 336 may include a return line 370 that redirects excess amounts of the first mixture 344 from the mixing head 348 to the tank 366 (e.g., during shutdown of the manufacturing system 336). From the tank 366, the first mixture 344 is pumped with a pump 368 to the mixing head 348. As the pump 368 pumps the first mixture 344 into the mixing head 348, the second chemical line 342 pumps a second mixture 346 (e.g., isocyanate 373) into the mixing head 348 using the pump 374. The first and second mixtures 344, 346 are then combined and discharged from the mixing head 348 to form the foam layer 312. In some embodiments, mixing head 348 is an impingement mix head. In particular embodiments, mixing takes place at a temperature of from about 5 to about 45° C. In some embodiments, mixing takes place at a pressure in excess of 2,000 psi. As explained above, when the first and second mixtures 344 and 346 combine they chemically react to form the foam 312 (e.g., polyurethane, polyisocyanurate, and one or more fillers). The mixture can then be deposited onto a facer 206 or other layers to form a roofing cover board, such as roofing cover board 200. For example, facer 206a may be positioned on a conveyor belt or other structure. The foam 312 may be poured onto the exposed upper surface (lower surface when installed) of the facer 206a. This allows a portion of the foam 312 to seep and penetrates into pores of the facer 206. In some embodiments, the facer 206a may be pre-coated with a conductive coating, similar to conductive coating 204. For example, during and/or after manufacture of the facer 206a, the conductive coating 204 may be applied, such as using dip coating, roll coating, spray coating, and/or using other coating application techniques. The coated facer 206a may then be cured, such as by passing the coated facer 206a through an infrared (IR) heater, a heat bank, convection heater, oven, and/or other heating mechanism. Once cured, the coated facer 206a may be introduced into system 300 where the foam 312 is poured atop the facer 206a. If only one major surface of the facer 206a is coated, the coated surface may be positioned face-down, such that the foam 312 is poured on the un-coated surface of the facer 206a. In some embodiments, a second facer 206b may be positioned atop the foam 312 to sandwich the foam 312 between the two facers 206.

The roofing cover board 200 may be positioned within and carried by a laminator. In some embodiments, the second facer 206b (if present) may be applied to the foam 312 prior to entering the laminator, while in other embodiments the second facer 206b may be applied while the first facer 206a and foam 312 are in the laminator. While in the laminator, foam 312 can be married to the facers 206 to form a composite. In some embodiments, the composite, while in laminator, or after removal from laminator, is exposed to heat that may be supplied by, for example, an oven. For example, laminator may include an oven or hot air source that heats the slats and side plates of the laminator and there through transfers heat to the laminate (i.e., to the reaction mixture). Once subjected to this heat, the composite (i.e., the reaction mixture), or a portion of the composite (i.e., reaction mixture) can be allowed to cool and/or may undergo conventional finishing within a finishing station, which may include, but is not limited to, trimming and cutting.

In embodiments in which the facer 206a is not pre-coated with the conductive coating 204, after the roofing cover board 200 has cured, the facer 206a may be coated with the conductive coating 204. For example, the conductive coating 204 may be rolled, sprayed, and/or otherwise applied to the exposed (bottom) side of the facer 206a. In some embodiments, the conductive coating 204 may be applied to the board 200 in a continuous and/or uniform manner having a consistent coating weight and/or coating thickness across at least a substantial portion of the surface area of the board 200. For example, the conductive coating 204 may be applied at a rate of between about 150 $ft^2$/gallon and 350 $ft^2$/gallon, more commonly between about 200 $ft^2$/gallon and 300 $ft^2$/gallon, and even more commonly between about 225 $ft^2$/gallon and 275 $ft^2$/gallon. In some embodiments having two facers 206, the top facer 206 may be coated. However, the facer 206a on which the foam 312 is poured often is flatter and provides better adhesion to the foam 312, which may make facer 206a more suitable for serving as the installed top (conductive) surface of the roofing cover board 200.

Once the conductive coating 204 has been applied, the coated roofing cover board 200 may be exposed to a heating device, such as an IR heater, a heat bank, convection heater, oven, and/or other heating mechanism, which may cure and/or otherwise dry the conductive coating 204. The application and/or drying of the conductive coating 204 may be performed prior to and/or after any finishing operations being performed on the roofing cover board 200. In some embodiments, an IR heater may be particular useful, as the heater may more efficiently drive moisture out of the coating 204 and the facer 206a.

It will be appreciated that while discussed with the additives, blowing agents, and/or fillers being present in the first stream (with the polyol), in some embodiments, one or more of the additional components may be included in the second stream. Additionally, it will be noted that the presence and/or quantities of any additives, fillers, and the like may be based upon the intended application of the final foam board product. In some embodiments, the manufacturing system 336 may include a return line 376 that returns excess second mixture 346 to the storage tank or isocyanate source 372 (e.g., during shutdown).

In order to control the manufacturing system 336, the manufacturing system 336 may include a control system 378. The control system 378 includes a controller 380 with one or more processors 382 that execute instructions stored on one or more memories 384 to control various components (e.g., pumps, mixers, valves, etc.) that form part of the first and second chemical lines 340, 342 using feedback from sensors and/or flowmeters.

For example, the manufacturing system 336 may include one or sensors 386 that monitor the mixing of the polyol 350, catalysts 356, viscosity additive 358, and blowing agent 360 and/or whether the polyol 350, catalysts 356, viscosity additive 358, and blowing agent 360 are within threshold ratios. If the proportions of polyol 350 and/or blowing agent 360 are outside of a threshold range, the controller 380 executes instructions with the processor 382 to increase and/or decrease the flow of the blowing agent 360 and/or polyol 350 using the pumps 352 and 362. Likewise, if the amounts of the catalysts 356 and/or viscosity additive 358 are outside of a threshold range, the controller 380 may execute instructions to control valves 388 and/or 390 to increase and/or decrease the amount of catalysts 356 and/or viscosity additive 358 entering the mixer 354.

Based on the measured amounts of polyol 350, catalysts 356, viscosity additive 358, and blowing agent 360, the controller 380 may control the amount of filler 338 that enters the mixer 364. For example, the controller 380 may control a valve 392 to increase and decrease the amount of filler 338 that enters the mixer 364. In some embodiments, the control system 378 may include a level sensor that detects the percentages of liquid and filler in the first mixture 344 to ensure the desired ratio of polyol 350, catalysts 356, viscosity additive 358 to filler 338 in the first mixture 344.

In order to control the ratio of the first mixture 344 to the second mixture 346 in the mixing head 348, the control system 378 may include flow meters 394, 396. As illustrated, the flow meter 394 enables measurement of the first mixture 344 entering the mixing head 348 and the flow meter 396 enables measurement of the second mixture 346 entering the mixing head 348. In operation, the controller 380 communicates with the flow meters 394, 396 and controls the pumps 368 and 374 in response to measured flow rates to ensure that the ratio of the first and second mixtures 344, 346 mix in the mixing head 348 within threshold ratios. In some embodiments, the concentration of the isocyanate-containing compound to the isocyanate-reactive compounds (polyol) within the respective chemical lines 340, 342 is adjusted to provide the foam product with an ISO index of between about 200-300.

It will be appreciated that other foam forming systems may be used to produce the polyisocyanurate foam used in the foam boards of the present application. For example, additional systems are disclosed in U.S. Patent Publication No. 2017/0321028, filed on May 9, 2016, the entire contents of which is hereby incorporated by reference.

Figure 4:
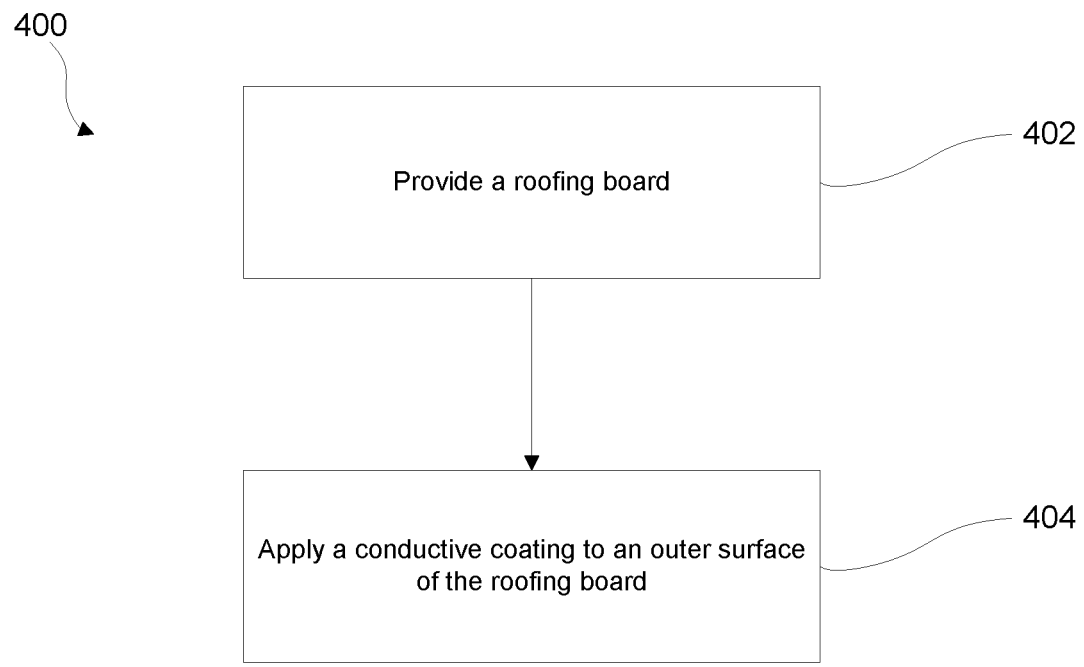
FIG. 4 is a flowchart illustrating process for forming a roofing cover board according to embodiments.

FIG. 4 is a flowchart illustrating a process 400 for forming a conductive roofing board in accordance with some embodiments of the present invention. Process 400 may be used to produce conductive roofing cover boards, such as roofing cover boards 200. Process 400 may begin at operation 402 by providing a roofing board. The roofing board may include a first major surface and a second major surface opposite the first major surface. The roofing board may include a polyisocyanurate foam board, an oriented strand board, a wood fiber board, a plywood board, or a gypsum board. Process 400 may also include applying a conductive coating to an outer surface of the roofing board at operation 404. For example, in some embodiments the conductive coating may be applied directly to the first major surface of the roofing board, such as by roll coating, spray coating, and/or otherwise applying the conductive coating to an outer surface of a finished roofing board. In such embodiments, the process 400 may include exposing the roofing board and the conductive coating to a heating device to cure the conductive coating. In other embodiments, the roofing board may include a facer, such as a glass mat and/or paper facer, that is applied to the first major surface. The conductive coating may be applied to an exposed surface of the facer. In some embodiments, the conductive coating may be coated and cured on the facer prior to joining the facer and the roofing board, while in other embodiments, the facer may be coated after being coupled with the roofing board.

In other embodiments, the application of the conductive material may be performed during formation of the roofing board. For example, a polyisocyanurate foam may be poured atop a facer to form a faced roofing board. The foam may be heated and/or compressed to adhere the foam and facer and to cure the foam. The facer may be pre-coated with a conductive coating and/or may be coated with the conductive coating after being joined with the roofing board. For example, after the foam has been cured, the conductive coating may be applied to the exposed surface of the facer. The conductive coating may then be exposed to a heat source, such as an IR heater, over, hot air blower, and/or other heating source to cure the conductive coating. In other embodiments, a surface of the face that will ultimately be exposed may be coated with the conductive coating prior to pouring the foam atop the facer.

Figure 5:
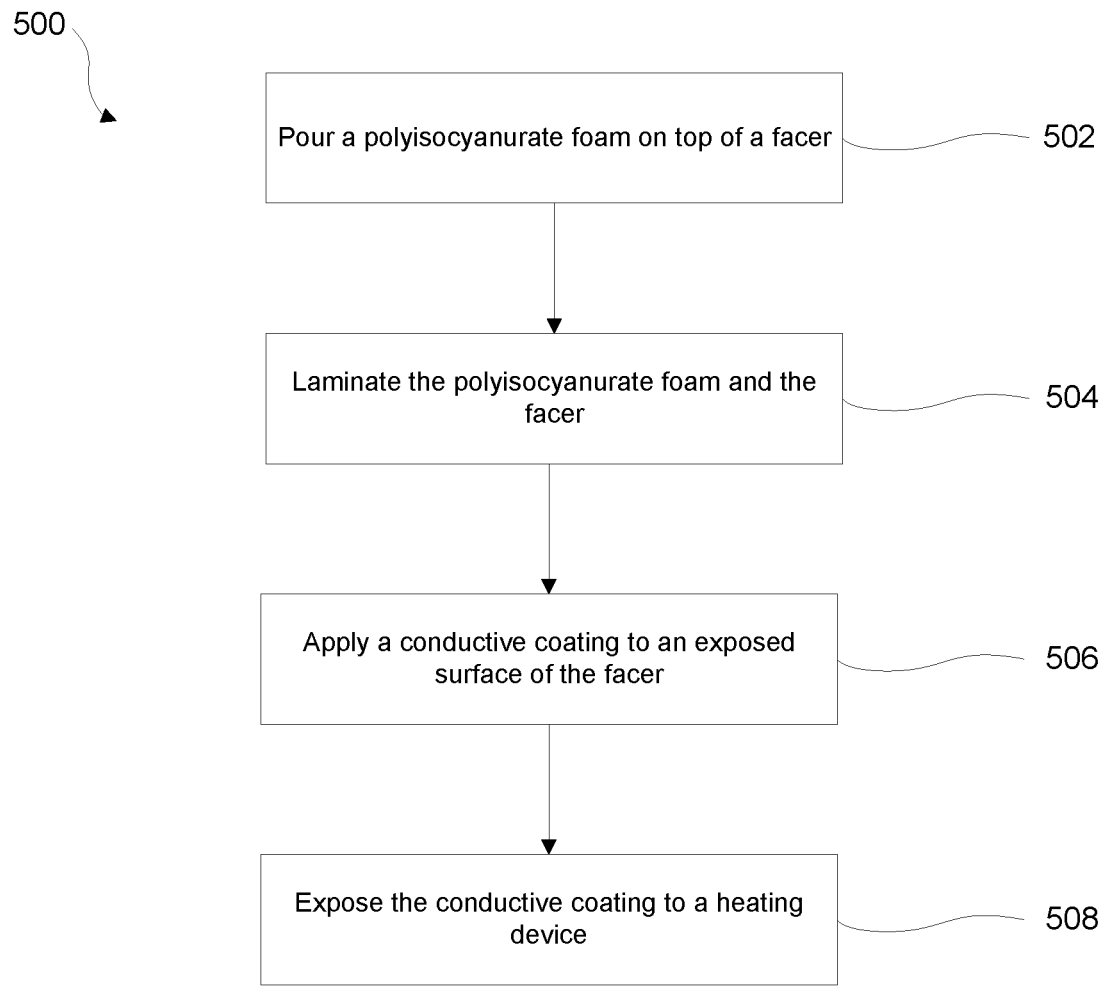
FIG. 5 is a flowchart depicting a process for forming a roofing cover board according to embodiments.

FIG. 5 is a flowchart that illustrates a process 500 for forming a conductive roofing board in accordance with some embodiments of the present invention. In particular, process 500 may be used to produce faced polyisocyanurate conductive roofing cover boards that may be similar to roofing cover boards 200b. Process 500 may begin at operation 502 by pouring a polyisocyanurate foam on top of a facer. The facer may be a nonwoven glass mat facer and/or a paper facer. At operation 504, the polyisocyanurate foam and the facer may be laminated to cure the polyisocyanurate foam and adhere the polyisocyanurate foam to the facer to form a roofing board. A conductive coating may be applied to an exposed surface of the facer at operation 506. For example, the conductive coating may be roll coated, spray coated, and/or otherwise applied in a uniform manner onto an exposed surface of the facer. In some embodiments, the exposed surface of the facer may be a downward-facing (during manufacture) surface of the facer, which may then be inverted to be upward-facing during installation of the roofing board. The conductive coating may saturate an interior region of the facer in some embodiments. For example, the conductive coating may flow into voids formed between individual fibers when the facer is a glass mat facer. In some embodiments, the conductive coating may include carbon black, graphite, carbon fibers, graphene, steel fibers, carbon nanotubes, and/or other conductive materials that provide sufficient electrical resistivity to the roofing board to be utilized in electronic leak detection systems. For example, the conductive materials may make up between about 5% and 30% by weight of the conductive coating such that the conductive coating exhibits an electrical resistance level of between about $1 \times 10^2$ and $1 \times 10^7$ ohms per square. At operation 508, the roofing board and the conductive coating may be exposed to a heating device to cure the conductive coating. For example, the roofing board and conductive coating may be passed by and/or through an IR heater, over, convection heating source, and/or other heating device to cure the conductive coating.

Figure 6:
FIG. 6 illustrates a number of roofing cover boards in a storage/transportation configuration.

The conductive roofing boards described herein may be ready for installation without any additional conductive materials that cover an entire top surface of the boards being applied at the installation site. Rather, only conductive strips that are used to conductively couple the boards together are needed at the installation site. For example, the roofing boards may be applied to a roofing deck with the conductive coating facing upward. A roofing membrane may be applied to the conductive coating side of the roofing boards immediately after securing the roofing boards in place. The factory-cured coating eliminates the need to wait for a field-applied conductive coating to be dried and may further speed up and/or simplify installation of a roofing system. In some embodiments, to transport the roofing boards to the installation site, a number of roofing boards, such as roofing boards 200, may be packed with major surfaces of the roofing boards being substantially parallel (but not coplanar) with one another. For example, as shown in FIG. 6 a number of roofing boards 600 (which may be similar to roofing boards 200) may be stacked atop one another and/or placed side-by side for storage and/or transport. In some embodiments, the conductive coating 602 of each roofing board may face a same direction, while in other embodiments a subset of the roofing boards 600 may face different directions. The roofing boards may be positioned directly against one another and/or may include one or more intervening layers, such as cushions and/or other protective layers.

The methods, systems, and devices discussed above are examples. Some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. It will be further appreciated that all testing methods described here may be based on the testing standards in use at the time of filing or those developed after filing.

It should be noted that the systems and devices discussed above are intended merely to be examples. It must be stressed that various embodiments may omit, substitute, or add various procedures or components as appropriate. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known structures and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein.

As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

What is claimed is:

1. A method of manufacturing a conductive roofing board, comprising:
   pouring a polyisocyanurate foam on top of a facer;
   laminating the polyisocyanurate foam and the facer to cure the polyisocyanurate foam and adhere the polyisocyanurate foam to the facer to form a roofing board;
   applying a conductive coating to an exposed surface of the facer, wherein the conductive coating has a coating weight of between about 0.1 lb/100 sqft and 10 lb/100 sqft; and
   exposing the roofing board and the conductive coating to a heating device to cure the conductive coating.

2. The method of manufacturing the conductive roofing board of claim 1, wherein:

the conductive coating comprises one or more selected from the group consisting of carbon black, graphite, carbon fibers, graphene, steel fibers, and carbon nanotubes.

3. The method of manufacturing the conductive roofing board of claim 1, wherein:
the facer comprises one or both of a nonwoven glass mat facer or a paper facer.

4. The method of manufacturing the conductive roofing board of claim 1, wherein:
the conductive coating is applied with a coating uniformity of at least about 90% across a surface area of the facer.

5. The method of manufacturing the conductive roofing board of claim 1, wherein:
applying the conductive coating comprises one or both of roll coating and spray coating the conductive coating onto the facer.

6. The method of manufacturing the conductive roofing board of claim 1, wherein:
applying the conductive coating comprises coating a downward-facing surface of the facer.

7. The method of manufacturing the conductive roofing board of claim 1, wherein:
the conductive coating has a resistance level of between about $1 \times 10^2$ and $1 \times 10^7$ ohms per square.

8. The method of manufacturing the conductive roofing board of claim 1, wherein:
the conductive coating saturates an interior region of the facer.

9. A method of manufacturing a conductive roofing board, comprising:
providing a roofing board, wherein the roofing board comprises:
a roofing board substrate comprising at least one of a polyisocyanurate foam board, an oriented strand board, a wood fiber board, a plywood board, or a gypsum board;
a facer applied to an outer surface of the roofing board substrate, the facer comprising one or both of paper and a nonwoven glass mat; and
applying a conductive coating to an exposed surface of the facer at a coating weight of between about 0.1 lb/100 sqft and 10 lb/100 sqft.

10. The method of manufacturing the conductive roofing board of claim 9, wherein:
the conductive coating is applied directly to a first major surface of the roofing board substrate.

11. The method of manufacturing the conductive roofing board of claim 2, wherein:
applying the conductive coating further comprises applying the conductive coating to the outer surface of the roofing board; and
the method further comprises exposing the roofing board and the conductive coating to a heating device to cure the conductive coating.

12. The method of manufacturing the conductive roofing board of claim 9, wherein:
a coating uniformity of the conductive coating is at least 90%.

13. The method of manufacturing the conductive roofing board of claim 9, wherein:
applying the conductive coating comprises pouring polyisocyanurate foam onto a facer that comprises the conductive coating.

* * * * *